G. W. COMBS.
GYRATORY STRUCTURE.
APPLICATION FILED JUNE 28, 1910.
1,192,501.
Patented July 25, 1916.
2 SHEETS—SHEET 1.
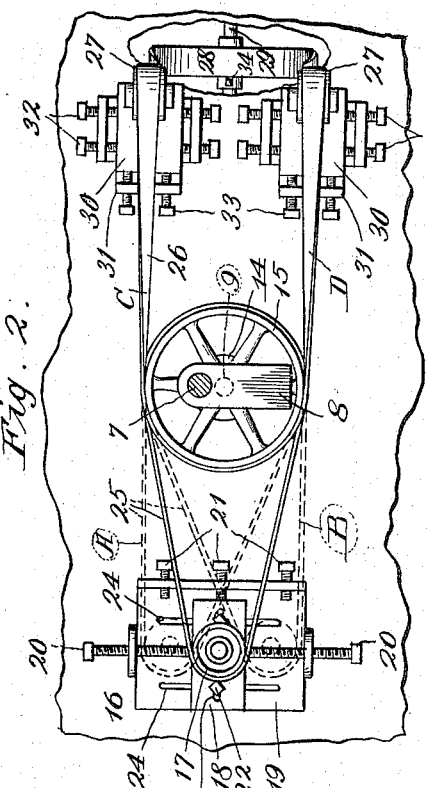
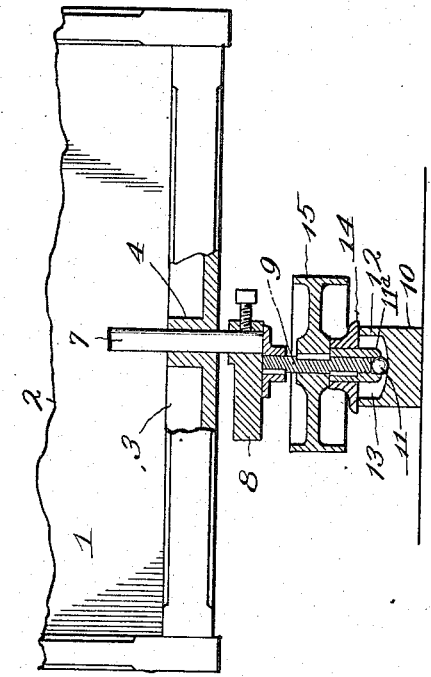
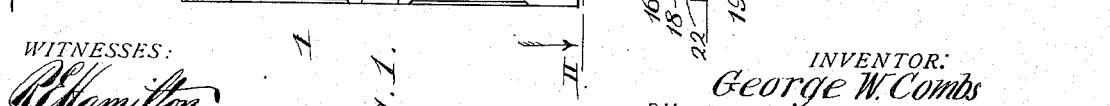
WITNESSES:
R. Hamilton
M. Cox.
INVENTOR:
George W. Combs
BY
F. G. Fischer
ATTORNEY.

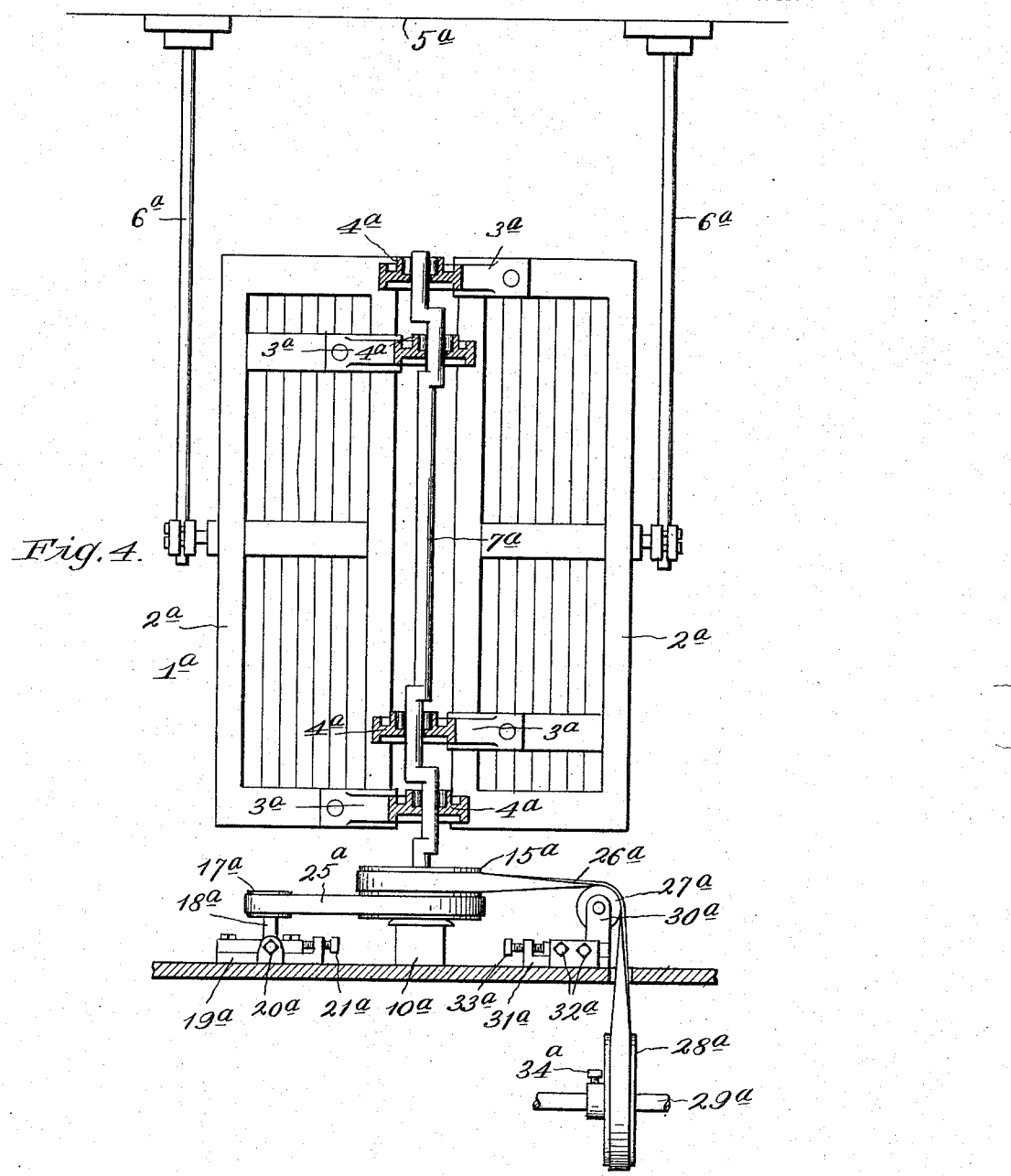

UNITED STATES PATENT OFFICE.

GEORGE W. COMBS, OF LEAVENWORTH, KANSAS.

GYRATORY STRUCTURE.

1,192,501. Specification of Letters Patent. Patented July 25, 1916.

Application filed June 28, 1910. Serial No. 569,404.

*To all whom it may concern:*

Be it known that I, GEORGE W. COMBS, a citizen of the United States, residing at Leavenworth, in the county of Leavenworth and State of Kansas, have invented certain new and useful Improvements in Gyratory Structures, of which the following is a specification.

This invention relates to improvements in gyratory structures, such for instance as bolters, sifters, screeners, sorting-machines, etc., and the present invention relates particularly to novel means for driving the structure and restraining the same from abnormal throw, to the end that it may properly perform its function without subjecting the building containing the same to undue strain or vibration.

In the accompanying drawings, Figure 1 shows a side elevation partly in section of a gyratory structure, provided with my improvements. Fig. 2 is a horizontal section on line II—II of Fig. 1. Fig. 3 is an enlarged broken section on line III—III of Fig. 1. Fig. 4 is a vertical section of a modified form of the invention.

1 designates the gyratory structure, which consists of a pair of sieve-boxes 2, united by bridge-trees 3, having centrally-disposed bearings 4. Sieve-boxes 2 are freely supported from the ceiling 5 by rods 6 which also prevent said sieve-boxes from rotating with a centrally-disposed vertically-positioned shaft 7. Shaft 7 is journaled in bearings 4, and provided with eccentric-weights 8 which in operation impart a gyratory motion to the structure. The weight of shaft 7 is supported by an eccentric-pin 9, constituting the center of rotation and mounted upon a step-bearing 10 on the floor of the building, an antifrictional ball 11 being interposed between the lower end of said eccentric-pin and the step-bearing, over the surface of which the eccentric-pin is free to move laterally in any direction. Ball 11 is retained in position beneath the eccentric-pin by a sleeve 11$^a$ secured to the lower portion of said eccentric-pin. Bearing 10 has an upwardly-extending wall 12, forming a lubricant-chamber 13 in which ball 11 operates, said lubricant-chamber being closed by a loosely-mounted cover 14 through which the eccentric-pin extends.

15 designates a pulley keyed or otherwise fixedly-mounted to the eccentric-pin to rotate the same.

16 designates a support on the floor of the building near pulley 15, and comprising an idler 17, an adjustable stand 18 carrying said idler, and a base-plate 19 containing set-screws 20 for adjusting stand 18 laterally, and set-screws 21 for adjusting said stand longitudinally. After such adjustments have been made, the stand is reliably locked on base-plate 19 by bolts 22 extending through slots 23 and 24 in the lower portion of the stand and the base-plate, respectively.

25 designates a belt or other flexible endless member running around pulley 15 and idler 17 to assist in restraining the structure from abnormal throw by assisting in holding the eccentric-pin 9 centrally within the lubricant-chamber 13, said belt being kept taut by proper adjustment of idler 17 and its stand 18.

26 designates an endless transmission member or belt which drives pulley 15 and assists belt 25 in restraining the structure from abnormal throw by tending to hold eccentric-pin 9 centrally within the lubricant-chamber 13. Belt 26 runs over a pair of idlers 27 to a stationary driver 28 mounted upon a shaft 29. Idlers 27 are carried upon stands 30 mounted upon base-plates 31, provided with set-screws 32 to adjust the stand longitudinally for the purpose of tensioning belt 26 and set-screws 33 for adjusting stands 30 laterally to assist in adjusting eccentric-pin 9 centrally within the lubricant-chamber 13. Belt 25 is laterally adjustable for the same purpose, for instance, if C be the tight or pulling side of belt 26, it would have a tendency to force the structure away from said side if not counteracted by adjusting belt 25 to the dotted position A (Fig. 2), and if D be the pulling side of belt 26, it will be necessary to adjust belt 25 to the dotted position B. Driver 28 is slidably-mounted upon shaft 29 so that it may be adjusted in proper relation to idlers 27 when the stands of the latter are adjusted longitudinally, and after such adjustment of said driver, it is locked upon the shaft by a set-screw 34, or other suitable means.

In the modified form disclosed by Fig. 4, the construction and operation is similar to that disclosed in the preferred form, the chief difference being that a four-box structure driven by a crank-shaft, similar to that disclosed by U. S. Letters Patent No. 12,894 (reissue) is substituted for the two-box structure and shaft disclosed by Fig. 1. Referring in detail to said modified form: 1ᵃ designates the gyratory structure consisting of sieve-boxes 2ᵃ connected in pairs by bridge-trees 3ᵃ having centrally-disposed bearings 4ᵃ. Sieve-boxes 2ᵃ are freely-supported from the ceiling 5ᵃ by rods 6ᵃ, which also prevent said sieve-boxes from rotating with a crank-shaft 7ᵃ journaled in bearings 4ᵃ and supported by a step-bearing 10ᵃ. Shaft 7ᵃ is driven by a pulley 15ᵃ fixed thereto, which in turn is driven by an endless member 26ᵃ, extending around said pulley and a stationary driver 28ᵃ, which latter is adjustably mounted upon a shaft 29ᵃ, to which it is secured by a set-screw 34ᵃ. Belt 26ᵃ extends over a pair of idlers 27ᵃ carried by two stands 30ᵃ, mounted upon base-plates 31ᵃ, provided with set-screws 32ᵃ and 33ᵃ for adjusting said stands laterally and longitudinally to properly adjust and tension belt 26ᵃ, which not only drives pulley 15ᵃ, but assists in restraining the structure from abnormal throw. Belt 26ᵃ is assisted in restraining the structure from abnormal throw by an endless belt 25ᵃ running around pulley 15ᵃ and an idler 17ᵃ, which latter is carried by a stand 18ᵃ, mounted upon a base-plate 19ᵃ, provided with set-screws 20ᵃ and 21ᵃ, whereby said stand and its idler 17ᵃ may be adjusted in any desired direction to adjust and tension belt 25ᵃ.

Having thus described my invention, what I claim is:

In combination, a structure freely-supported for gyration, a shaft thereto, a pulley fixed to said shaft, a stationary driver, an endless element running around said driver and the pulley to drive the latter and restrain the structure from lunging, an endless element running around the pulley and extending in an opposite direction from the first-mentioned element to assist the same only in restraining the structure from lunging, a support adjacent the pulley for the second endless element, and means for adjusting said support.

In testimony whereof I affix my signature, in the presence of two witnesses.

GEORGE W. COMBS.

Witnesses:
HENRY BAUM,
HARRY T. LAFFIN.

Copies of this patent may be obtained for five cents each, by addressing the "Commissioner of Patents. Washington, D. C."